(12) United States Patent
Pietruska et al.

(10) Patent No.: US 7,360,678 B2
(45) Date of Patent: Apr. 22, 2008

(54) REPAIR AND RECLASSIFICATION OF SUPERALLOY COMPONENTS

(75) Inventors: Norman Pietruska, Durham, CT (US); Walter E. Olson, Vernon, CT (US); Beth K. Abriles, Madison, CT (US); David A. Rutz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 190 days.

(21) Appl. No.: 11/044,938

(22) Filed: Jan. 27, 2005

(65) Prior Publication Data

US 2006/0163323 A1 Jul. 27, 2006

(51) Int. Cl.
*B23K 31/00* (2006.01)
*B23K 35/36* (2006.01)

(52) U.S. Cl. ........................... 228/119; 228/226
(58) Field of Classification Search ............... None
See application file for complete search history.

(56) References Cited

U.S. PATENT DOCUMENTS

| 4,008,844 | A | | 2/1977 | Duvall et al. | |
|---|---|---|---|---|---|
| 4,028,787 | A | | 6/1977 | Cretella et al. | |
| 4,073,639 | A | | 2/1978 | Duvall et al. | |
| 4,493,451 | A | * | 1/1985 | Clark et al. | 228/119 |
| 4,705,203 | A | | 11/1987 | McComas et al. | |
| 4,726,101 | A | | 2/1988 | Draghi et al. | |
| 5,142,778 | A | | 9/1992 | Smolinski et al. | |
| 5,437,737 | A | | 8/1995 | Draghi et al. | |
| 5,522,134 | A | | 6/1996 | Rowe et al. | |
| 5,549,767 | A | | 8/1996 | Pietruska et al. | |
| 5,735,448 | A | * | 4/1998 | Draghi et al. | 228/119 |
| 5,741,378 | A | | 4/1998 | Pietruska et al. | |
| 5,806,751 | A | | 9/1998 | Schaefer et al. | |
| 5,922,150 | A | * | 7/1999 | Pietruska et al. | 148/674 |
| 6,004,683 | A | | 12/1999 | Rafferty et al. | |
| 6,049,978 | A | * | 4/2000 | Arnold | 29/889.1 |
| 6,093,368 | A | * | 7/2000 | Rafferty et al. | 419/9 |

(Continued)

FOREIGN PATENT DOCUMENTS

EP  0 836 904 A  4/1998

(Continued)

OTHER PUBLICATIONS

European Search Report dated Jun. 8, 2006.

*Primary Examiner*—Kiley Stoner
(74) *Attorney, Agent, or Firm*—Tracey R. Loughlin

(57) ABSTRACT

Novel materials and methods for repairing/reclassifying superalloy components are described herein. These materials are non-traditional blends of materials having a much higher base material content than traditional repair/reclassification materials. In embodiments used to repair/reclassify nickel-based components, these materials may comprise about 5-18.9 weight percent of a low melting point alloy and about 81.1-95 weight percent of a base material. In embodiments used to repair/reclassify cobalt-based components, these materials may comprise about 15-30 weight percent of a low melting point alloy and about 70-85 weight percent of a base material. These materials can be used to repair surface defects and/or build up worn or eroded areas of a component to meet precise dimensional and metallurgical requirements. These materials create robust repaired components having a dense, isothermally solidified structure having minimal borides and a high re-melt temperature.

6 Claims, 2 Drawing Sheets

U.S. PATENT DOCUMENTS

| | | |
|---|---|---|
| 6,503,349 B2 * | 1/2003 | Pietruska et al. ........... 148/562 |
| 6,571,472 B2 * | 6/2003 | Berry et al. ................ 29/889.1 |
| 6,725,540 B2 | 4/2004 | Bose et al. |
| 6,742,698 B2 | 6/2004 | Shah et al. |
| 2005/0098243 A1 * | 5/2005 | Budinger et al. ........... 148/527 |
| 2005/0274009 A1 * | 12/2005 | Powers ...................... 29/889.1 |
| 2006/0049236 A1 * | 3/2006 | Minor et al. ................ 228/119 |

FOREIGN PATENT DOCUMENTS

| | | |
|---|---|---|
| EP | 836904 A2 * | 4/1998 |
| EP | 1 258 312 A | 11/2002 |
| EP | 1 491 283 A | 12/2004 |

* cited by examiner

100X

REPAIR AND RECLASSIFICATION OF SUPERALLOY COMPONENTS

FIELD OF THE INVENTION

The present invention relates generally to turbine engines, and more specifically, to the repair and reclassification of worn or damaged turbine engine components.

BACKGROUND OF THE INVENTION

Gas turbine engines have long been used to propel aircraft, generate electric power, and pump fluids, etc. The turbine sections of such engines comprise alternating rows of static vanes and rotating blades. These vanes stabilize and direct the gas flow from one row of rotating turbine blades to the next, thereby optimizing the amount of work that is extracted from the turbine section. A nozzle area is defined by the spacing between adjacent vanes, and is typically assigned a classification number corresponding to the volumetric gas flow that passes therethrough.

During operation, abrasives and corrosives in the hot gas flow impinge upon the turbine vanes, causing them to deteriorate, erode or become otherwise damaged. Furthermore, the hot gas flow causes distortion of the vanes, which enlarges the nozzle area and diminishes the efficiency of the turbine. Therefore, during periodic engine overhauls, these turbine vanes are inspected for physical damage and are evaluated to determine the change in the flow area or nozzle classification that has occurred. Generally, these vanes must either be replaced, or damaged areas must be repaired and eroded material must be replaced to reclassify the vanes before they can be returned to service in an engine.

While there are many existing methods for repairing and/or reclassifying components such as turbine vanes, they all have their drawbacks. Therefore, it would be desirable to have improved methods for repairing and/or reclassifying such components. It would also be desirable to have methods for repairing and/or reclassifying such components that may otherwise be unrepairable.

SUMMARY OF THE INVENTION

The above-identified shortcomings of existing repair and/or reclassifying methods and materials are overcome by embodiments of the present invention, which relates to improved repair and/or reclassifying methods and materials. This invention may be utilized to repair and/or reclassify various components, such as, but not limited to, gas turbine engine components.

Embodiments of this invention comprise methods for building up material on a metallic article. These methods may comprise: if the metallic article comprises a nickel-based material, applying a nickel-based material comprising about 5-18.9 weight percent low melting point nickel-based alloy and about 81.1-95 weight percent nickel-based base material on a predetermined area of the metallic article to build up the predetermined area; if the metallic article comprises a cobalt-based material, applying a cobalt-based material comprising about 15-30 weight percent low melting point cobalt-based alloy and about 70-85 weight percent cobalt-based base material on a predetermined area of the metallic article to build up the predetermined area; and heat treating the article at a predetermined temperature (i.e., about 1093-1260° C.) for a predetermined amount of time (i.e., about 4-20 hours). These methods may further comprise removing any coating, oxides or contaminants on the metallic article prior to depositing the nickel-based material or the cobalt-based material on the metallic article. These methods may further comprise applying a protective coating to the metallic article, at least partially covering the nickel-based material or the cobalt-based material, after the heat treating step.

The nickel-based base material and/or the cobalt-based base material may comprise a composition similar to that of the metallic article. The low melting point nickel-based alloy and/or the low melting point cobalt-based alloy may also comprise a composition similar to that of the metallic article but include about 0.7-8.5 weight percent of a melting point depressant.

The metallic article may comprise any suitable nickel-based superalloy and/or cobalt-based superalloy, whether a single crystal alloy, a directionally solidified alloy, and/or a polycrystalline alloy. The metallic article may comprise a gas turbine engine component, such as, but not limited to, a high pressure turbine vane, a low pressure turbine vane, a low pressure turbine blade, a blade outer air seal, a transition duct, a combustion liner, a seal support, a bucket, a cast case, a fuel nozzle, a combustor case, and/or a combustor shingle.

Embodiments of this invention also comprise methods of repairing surface defects and replacing material on a nickel-based metallic article. These methods may comprise: depositing a first material on a predetermined area of a nickel-based metallic article, the composition of the first material comprising about 30-50 weight percent low melting point alloy mixed with about 50-70 weight percent base material; depositing a second material over the first material, the composition of the second material comprising about 5-18.9 weight percent low melting point alloy mixed with about 81.1-95 weight percent base material; and heat treating the article at a predetermined temperature for a predetermined amount of time.

Embodiments of this invention also comprise methods of repairing surface defects and replacing material on a cobalt-based metallic article. These methods may comprise: depositing a first material on a predetermined area of a cobalt-based metallic article, the composition of the first material comprising about 40-50 weight percent low melting point alloy mixed with about 50-60 weight percent base material; depositing a second material over the first material, the composition of the second material comprising about 15-30 weight percent low melting point alloy mixed with about 70-85 weight percent base material; and heat treating the article at a predetermined temperature for a predetermined amount of time.

The first material and the second material may be deposited as a single graded layer, wherein the composition of the graded layer is similar to the composition of the first material as deposition initially begins, and then the composition of the graded layer varies to become similar to the composition of the second material as the graded layer continues to be deposited.

Further details of this invention will be apparent to those skilled in the art during the course of the following description.

DESCRIPTION OF THE DRAWINGS

Embodiments of this invention are described herein below with reference to various figures, wherein like characters of reference designate like parts throughout the drawings, in which.

DETAILED DESCRIPTION OF THE INVENTION

Figure 1:
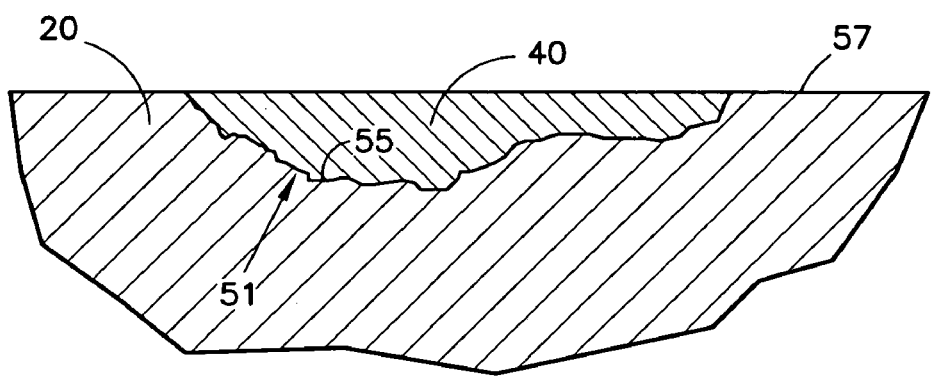
FIG. 1 is a schematic drawing showing an embodiment of this invention utilizing a single layer repair/reclassification system.
Figure 2:
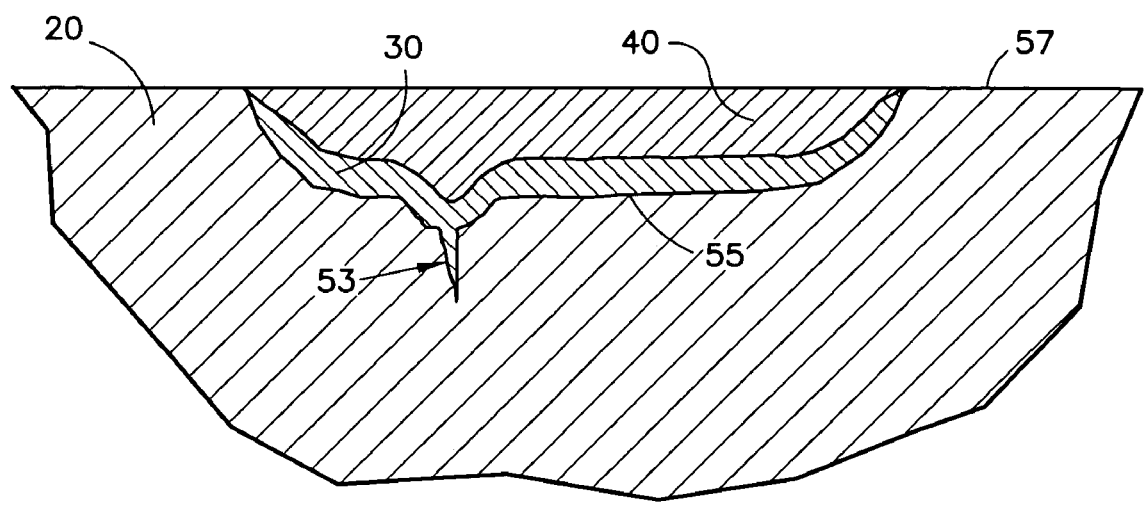
FIG. 2 is a schematic drawing showing another embodiment of this invention utilizing a multilayer repair/reclassification system.
Figure 3:
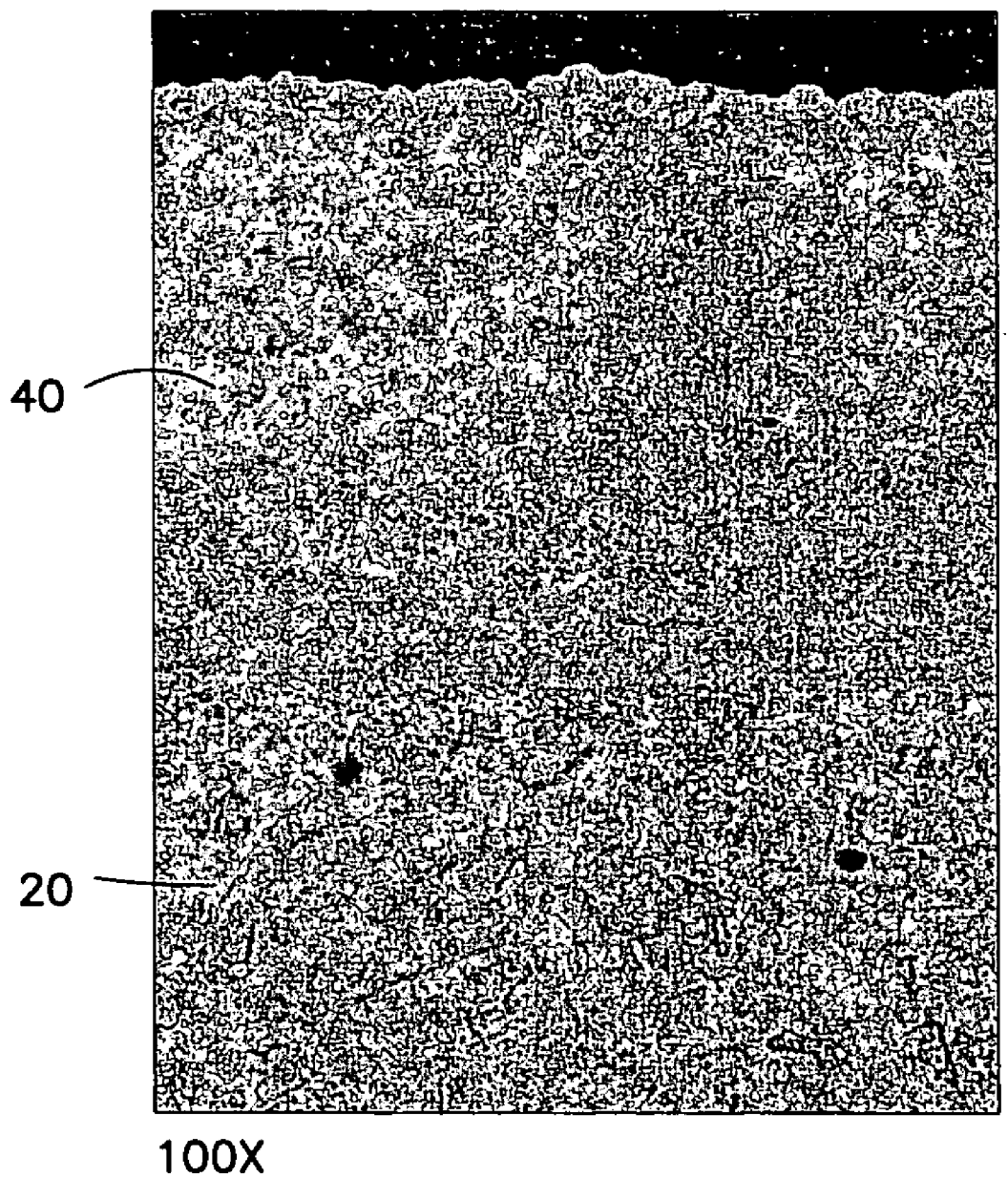
FIG. 3 is a photomicrograph showing the embodiment of this invention depicted in FIG. 1.

For the purposes of promoting an understanding of the invention, reference will now be made to some embodiments of this invention as illustrated in FIGS. 1-3 and specific language used to describe the same. The terminology used herein is for the purpose of description, not limitation. Specific structural and functional details disclosed herein are not to be interpreted as limiting, but merely as a basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention as described and claimed.

This invention relates to methods and materials for repairing surface defects (i.e, cracks) and/or restoring dimensions to a component (i.e, reclassifying a component), such as a gas turbine engine component. Embodiments of this invention provide controlled build up of worn or eroded areas of a component to meet precise dimensional and metallurgical requirements. Prior to restoring dimensions to a component, surface defects may also be repaired with embodiments of this invention. This invention creates robust repaired components having a dense, isothermally solidified structure having minimal borides and a high re-melt temperature.

Many suitable components can be refurbished, repaired or restored by embodiments of this invention. For example, turbine vanes are often distorted or dimensionally changed due to the harsh operating conditions to which they are subjected. Such eroded or distorted surfaces can be refurbished or restored with embodiments of this invention, thereby restoring critical gas path dimensions to these components. Furthermore, surface defects may be repaired simultaneously therewith.

Before the materials of this invention can be applied to a component, such as a turbine vane, any coatings, oxides or contaminants on the component may first need to be removed. Coating removal may be accomplished in any suitable manner, such as, but not limited to, grit blasting, machining, belting with abrasives, chemical stripping, waterjet blasting and/or autoclave processing, etc., either alone or in combination. Thereafter, the surface of the component to be repaired, including crack walls, may be cleaned of residual oxides, debris, organic contaminants, etc. This cleaning may be accomplished in any suitable manner, such as, but not limited to, vacuum and/or hydrogen heat treating, processing through hydrogen fluoride gas, grinding, rinsing with aqueous or organic solvents, etc.

Once the component surfaces are cleaned, the component may be positioned for coating in any suitable high energy coating system, such as, but not limited to, a high velocity oxy fuel (HVOF) system, a low pressure plasma spray (LPPS) system, an air plasma spray (APS) system, a cold spray system, etc. In embodiments, HVOF may be desired because it can produce coatings that are nearly 100% dense, having porosity therein of less than about 0.5%. As shown in FIG. 1, the eroded area 51 of a component 20 may be built back up to desired dimensions by applying a material 40 comprising a low melting point alloy and a base material. If the component 20 is made of a nickel-based material, the material 40 may comprise about 5-18.9 weight percent of a low melting point alloy and about 81.1-95 weight percent of a base material that is compatible with the nickel-based material of the component 20. If the component 20 is made of a cobalt-based material, the material 40 may comprise about 15-30 weight percent of a low melting point alloy and about 70-85 weight percent of a base material that is compatible with the cobalt-based material of the component 20. These non-traditional blends of materials 40 have much higher base material contents than used in existing repair and/or reclassification methods, which typically only include up to about 60 weight percent base material when repairing nickel-based materials, and up to about 50 weight percent base material when repairing cobalt-based materials.

When repairing/restoring some exemplary nickel-based components, this material 40 may comprise about 18.9 weight percent low melting point alloy and about 81.1 weight percent base material. In other embodiments, this material 40 may comprise about 10 weight percent low melting point alloy and about 90 weight percent base material. In yet other embodiments, this material 40 may comprise about 5 weight percent low melting point alloy and about 95 weight percent base material. Numerous other embodiments are also possible.

When repairing/restoring some exemplary cobalt-based components, this material 40 may comprise about 30 weight percent low melting point alloy and about 70 weight percent base material. In other embodiments, this material 40 may comprise about 25 weight percent low melting point alloy and about 75 weight percent base material. In yet other embodiments, this material 40 may comprise about 15 weight percent low melting point alloy and about 85 weight percent base material. Numerous other embodiments are also possible.

There are many benefits associated with using such a high base material content in such materials 40, all of which may allow repairs to be made that may not otherwise be made satisfactorily with existing repair/reclassification methods and materials. The materials 40 deposited in this invention are fully dense, have a higher re-melt temperature, and contain fewer brittle borides, than existing repair/reclassification materials.

In addition to restoring dimensions to a component, embodiments of this invention also allow surface defects, such as cracks 53, to be repaired. In such embodiments, as shown in FIG. 2, where the component 20 is made of a nickel-based material, a first material 30 comprising about 30-50 weight percent of a low melting point alloy mixed with about 50-70 weight percent of a base material that is compatible with the nickel-based material of the component 20 can be deposited on the component 20. Thereafter, a second material 40 comprising about 5-18.9 weight percent of a low melting point alloy and about 81.1-95 weight percent of a base material that is compatible with the nickel-based material of the component 20 can be deposited on top of the first material 30. Numerous other embodiments are also possible.

In such embodiments, as shown in FIG. 2, where the component 20 is made of a cobalt-based material, a first material 30 comprising about 30-50 weight percent of a low melting point alloy mixed with about 50-70 weight percent of a base material that is compatible with the cobalt-based material of the component 20 can be deposited on the component 20. Thereafter, a second material 40 comprising about 15-30 weight percent of a low melting point alloy and about 70-85 weight percent of a base material that is compatible with the cobalt-based material of the component 20 can be deposited on top of the first material 30. Numerous other embodiments are also possible.

Still referring to FIG. 2, the first and second materials 30, 40 may be deposited in the same manner described above for the restoration method (i.e., HVOF, LPPS, APS, cold spray, etc.). In embodiments, the first and second materials 30, 40 may be deposited as separate layers in one continuous spray process. However, the first and second materials 30, 40 may be deposited in separate spray processes, if desired. The materials 30, 40 of this invention may also be deposited as continuously graded layers, if desired. This invention is advantageous because it drives a very dense material 30, which has a relatively high amount of a low melting point alloy, into the crack cavities 53 prior to heat treatment, where it is well positioned to melt and flow via capillary action into the root of the crack during heat treatment. Application of the second material 40 of this invention, which has a smaller amount of the low melting point alloy, near the typically wider entrance of the crack (i.e., near the surface 55), produces a dense, low boride deposit at the surface 57. Existing techniques rely on liquid melt flowing into such cracks and then isothermally solidifying during heat treatment, which is less desirable than the techniques of this invention because, with existing techniques, it is difficult to balance the amount of liquid needed to fully heal the root of the cracks without producing a microstructure having excessive borides near the surface of the crack.

In embodiments such as those shown in FIG. 2, where the component 20 is made of a nickel-based material, the first material 30 may comprise about 50 weight percent low melting point alloy and about 50 weight percent base material, and the second material 40 may comprise about 18.9 weight percent low melting point alloy and about 81.1 weight percent base material. In other embodiments where the component 20 is made of a nickel-based material, the first material 30 may comprise about 40 weight percent low melting point alloy and about 60 weight percent base material, and the second material 40 may comprise about 10 weight percent low melting point alloy and about 90 weight percent base material. In yet other embodiments where the component 20 is made of a nickel-based material, the first material 30 may comprise about 60 weight percent low melting point alloy and about 40 weight percent base material, and the second material 40 may comprise about 5 weight percent low melting point alloy and about 95 weight percent base material. Numerous other embodiments are also possible.

In embodiments such as those shown in FIG. 2, where the component 20 is made of a cobalt-based material, the first material 30 may comprise about 50 weight percent low melting point alloy and about 50 weight percent base material, and the second material 40 may comprise about 30 weight percent low melting point alloy and about 70 weight percent base material. In other embodiments where the component 20 is made of a cobalt-based material, the first material 30 may comprise about 40 weight percent low melting point alloy and about 60 weight percent base material, and the second material 40 may comprise about 25 weight percent low melting point alloy and about 75 weight percent base material. In yet other embodiments where the component 20 is made of a cobalt-based material, the first material 30 may comprise about 40 weight percent low melting point alloy and about 60 weight percent base material, and the second material 40 may comprise about 20 weight percent low melting point alloy and about 80 weight percent base material. Numerous other embodiments are also possible.

In nickel-based embodiments of this invention that comprise a graded layer, the material being deposited initially, near surface 55, may comprise about 30-50 weight percent of a low melting point alloy mixed with about 50-70 weight percent of a base material that is compatible with the nickel-based material of the component being repaired. Then, as the material continues to be deposited, it may continue to vary in composition until, near the outer surface of the deposited material, at surface 57, it comprises about 5-18.9 weight percent of a low melting point alloy and about 81.1-95 weight percent of a base material that is compatible with the nickel-based material of the component being repaired. Numerous other embodiments are also possible.

In cobalt-based embodiments of this invention that comprise a graded layer, the material being deposited initially, near surface 55, may comprise about 40-50 weight percent of a low melting point alloy mixed with about 50-60 weight percent of a base material that is compatible with the cobalt-based material of the component being repaired. Then, as the material continues to be deposited, it may continue to vary in composition until, near the outer surface of the deposited material, at surface 57, it comprises about 15-30 weight percent of a low melting point alloy and about 70-85 weight percent of a base material that is compatible with the cobalt-based material of the component being repaired. Numerous other embodiments are also possible.

The base materials utilized in this invention may closely match the composition of the component being restored. For example, in embodiments, if a turbine vane is being restored, this base material may comprise a cobalt-based superalloy such as Mar-M 509, an equiaxed nickel-based superalloy such as Mar-M 247, a directionally solidified nickel-based superalloy such as Mar-M 200+Hf or PWA 1426, a single crystal nickel-based superalloy such as PWA1484 or PWA 1480, etc.

The low melting point alloys utilized in this invention may comprise a composition similar to the base material, but include about 0.7-8.5 weight percent of a melting point depressant, such as boron or silicon, therein.

Once the surface defects are repaired and/or the eroded areas are built back up to the desired dimensions, the component can be heat treated to densify the coating and create a diffusion bond between the deposited materials and the underlying component. During heat treatment, the deposited material bonds with the component and forms a continuous, void-free, isothermally solidified microstructure therewith. Suitable times and temperatures should be selected so as to provide favorable diffusion characteristics, while also maintaining the metallurgical integrity of the underlying component (i.e., while avoiding incipient melting and/or recrystallization of the underlying component). In embodiments, the heat treatment may comprise heating the component to about 2000-2300° F. (1093-1260° C.) and holding it at that temperature for about 4-20 hours.

After heat treating, the repaired/restored component can be inspected in any suitable manner to ensure the component is acceptable for use. Such inspection methods may include, but are not limited to, visual inspection, dimensional inspection, fluorescent penetrant inspection, metallography, etc.

Thereafter, a protective coating (i.e., a thermal barrier coating, an environmental barrier coating, a wear resistant coating, etc.) may be applied to the component, if desired.

These coatings and the methods for applying same are well known and may include nickel or cobalt aluminides, MCrAlY overlay coatings, etc. that are applied by diffusion processes, APS, LPPS, HVOF, electron beam physical vapor deposition (EBPVD), etc.

The components that are repaired by embodiments of this invention may comprise any suitable nickel-based superalloys and/or cobalt-based superalloys. These superalloys may comprise single crystal materials, directionally solidified materials, polycrystalline materials and/or combinations thereof.

The mechanical properties of these repaired and/or reclassified components can be equivalent to, or nearly equivalent to, those of the original component. However, the mechanical properties may vary depending upon the volume fraction of the material that is replaced, the specific alloy of the component, the composition of the replacement material, the heat treatment used, the method used to apply the material, etc.

EXAMPLE ONE

In an exemplary embodiment, a single continuous thermal spray process was utilized to deposit a material of this invention onto a cobalt-based substrate. The material comprised about 20 weight percent of a low melting point alloy and about 80 weight percent of a cobalt base material that is compatible with the cobalt-based substrate material. The cobalt base material had a nominal composition of about 23.4 weight percent Cr, about 10 weight percent Ni, about 7 weight percent W, about 3.5 weight percent Ta, about 0.22 weight percent Ti, about 0.45 weight percent Zr, about 0.60 weight percent C, and about 54.8 weight percent Co. The low melting point alloy had a nominal composition of about 24 weight percent Cr, about 40 weight percent Ni, about 2.95 weight percent B, and about 33 weight percent Co. A LPPS process was used to create a coating about 0.075 inches thick on the cobalt-based substrate. The following thermal spray parameters were used.

| Parameter | Setting |
| --- | --- |
| Gun | EPI Plasma |
| Primary/carrier gas | Argon |
| Secondary gas | Helium |
| Primary pressure | Arc Gas #1 - 250 psi |
| | Powder Hopper #1 - 150 psi |
| | Powder Hopper #2 - 150 psi |
| Secondary pressure | Arc Gas #2 - 225 psi |
| Chamber Pressure (spray) | 35-40 torr |
| Current | 1600 amps |
| Voltage | 55 volts |
| Power | 88 Kw |
| Feeder RPM | #1 - 1.32 RPM |
| | #2 - 1.28 RPM |
| Powder feedrate | #1 - 6 lbs/hr |
| | #2 - 6 lbs/hr |
| | Total - 12 lbs/hr |
| Stand off/Gun height | 13 inches |
| Spray temperature | 1500° F. (816° C.) |
| Substrate temperature | 1500° F. (816° C.) |
| Cycles | 64 cycles/pattern |
| Thickness | 0.075 +/- 0.010 |
| Gun speed | 36 in/min |

After the materials were deposited on this cobalt-based substrate, the coated substrate was heat treated at a temperature of about 2100° F. (1149° C.) for about 6 hours to densify the coating and create a diffusion bond between the deposited materials and the underlying component. Thereafter, standard inspection techniques (i.e., visual inspection, fluorescent penetrant inspection, etc.) were used to ensure there were no defects remaining and the component was acceptable for use. Additionally, metallography was used to verify that this component had been acceptably repaired.

EXAMPLE TWO

In another exemplary embodiment, a single continuous thermal spray process was utilized to deposit a material of this invention onto a nickel-based substrate. The material comprised about 10 weight percent of a low melting point alloy and about 90 weight percent of a nickel base material that is compatible with the nickel-based substrate material. The nickel base material had a nominal composition of about 9 weight percent Cr, about 10 weight percent Co, about 12 weight percent W, about 1 weight percent Cb/Nb, about 2 weight percent Ti, about 5 weight percent Al, about 0.015 weight percent B, about 1.65 weight percent Hf, about 0.014 weight percent C, and about 59 weight percent Ni. The low melting point alloy had a nominal composition of about 9 weight percent Cr, about 8 weight percent Co, about 4 weight percent W, about 2 weight percent Al, about 3 weight percent B, about 1 weight percent Hf, and about 73 weight percent Ni. A LPPS process was used to create a coating about 0.045 inches thick on the nickel-based substrate. The following thermal spray parameters were used.

| Parameter | Setting |
| --- | --- |
| Gun | EPI Plasma |
| Primary/carrier gas | Argon |
| Secondary gas | Helium |
| Primary pressure | Arc Gas #1 - 250 psi |
| | Powder Hopper #1 - 150 psi |
| | Powder Hopper #2 - 150 psi |
| Secondary pressure | Arc Gas #2 - 225 psi |
| Current | 1550 amps |
| Voltage | 56 volts |
| Power | 87 Kw |
| Feeder RPM | #1 - 1.26 RPM |
| | #2 - 1.29 RPM |
| Powder feedrate | #1 - 6.1 lbs/hr |
| | #2 - 6.1 lbs/hr |
| | Total - 12.2 lbs/hr |
| Stand off/Gun height | 13 inches |
| Spray temperature | 1500° F. (816° C.) |
| Substrate temperature | 1500° F. (816° C.) |
| Cycles | 5 passes |
| Thickness | 0.045 |
| Gun speed | 36 in/min |

After the materials were deposited on this nickel-based substrate, the coated substrate was heat treated at a temperature of about 2200° F. (1204° C.) for about 4 hours to densify the coating and create a diffusion bond between the deposited materials and the underlying component. Thereafter, standard inspection techniques (i.e., visual inspection, fluorescent penetrant inspection, etc.) were used to ensure there were no defects remaining and the component was acceptable for use. Additionally, metallography was used to verify that this component had been acceptably repaired.

This invention can be used to repair/reclassify many aero and/or land based gas turbine engine components, such as, but not limited to, high pressure turbine vanes, low pressure turbine vanes, low pressure turbine blades, blade outer air seals, transition ducts, combustion liners, seal supports, buckets, cast cases, fuel nozzles, combustor cases, combustor shingles, and any other cast superalloy components that can be exposed to the necessary heat treatment without the base metal mechanical properties experiencing unacceptable degradation.

As described above, this invention provides methods and materials for repairing and/or restoring/reclassifying various components. Advantageously, this invention allows eroded areas to be restored to original dimensions, and also allows surface defects to be repaired simultaneously therewith. Additionally, if a previously repaired/reclassified component needs additional repair/reclassification, the materials of this invention can be applied to the previously-applied materials, instead of to the base metal of the component as previously described above. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while the repair and/or reclassification of turbine vanes was described herein, this invention may be used to repair many other gas turbine engine components, and other components. Thus, it is intended that the present invention cover all suitable modifications and variations as come within the scope of the appended claims and their equivalents.

What is claimed is:

1. A method of repairing surface defects and replacing material on a nickel-based metallic article, comprising:
    depositing a first material on a predetermined area of the metallic article, the composition of the first material comprising about 30-50 weight percent low melting point alloy mixed with about 50-70 weight percent base material;
    depositing a second material over the first material, the composition of the second material comprising about 5-18.9 weight percent low melting point alloy mixed with about 81.1-95 weight percent base material; and
    heat treating the article at a predetermined temperature for a predetermined amount of time.

2. The method of claim 1, wherein the predetermined temperature is about 1093-1260° C. and the predetermined time is about 4-20 hours.

3. The method of claim 1, wherein the first material and the second material are deposited as a single graded layer, wherein the composition of the graded layer is similar to die composition of the first material as deposition initially begins, and then the composition of the graded layer varies to become similar to the composition of the second material as the graded layer continues to be deposited.

4. A method of repairing surface defects and replacing material on a cobalt-based metallic article, comprising:
    depositing a first material on a predetermined area of the metallic article, the composition of the first material comprising about 40-50 weight percent low melting point alloy mixed with about 50-60 weight percent base material;
    depositing a second material over the first material, the composition of the second material comprising about 15-30 weight percent low melting point alloy mixed with about 70-85 weight percent base material; and
    heat treating the article at a predetermined temperature for a predetermined amount of time.

5. The method of claim 4, wherein the predetermined temperature is about 1093-1260° C. and the predetermined time is about 4-20 hours.

6. The method of claim 4, wherein the first material and the second material are deposited as a single graded layer, wherein the composition of the graded layer is similar to the composition of the first material as deposition initially begins, and then the composition of the graded layer varies to become similar to the composition of the second material as the graded layer continues to be deposited.

* * * * *